Figure 1:
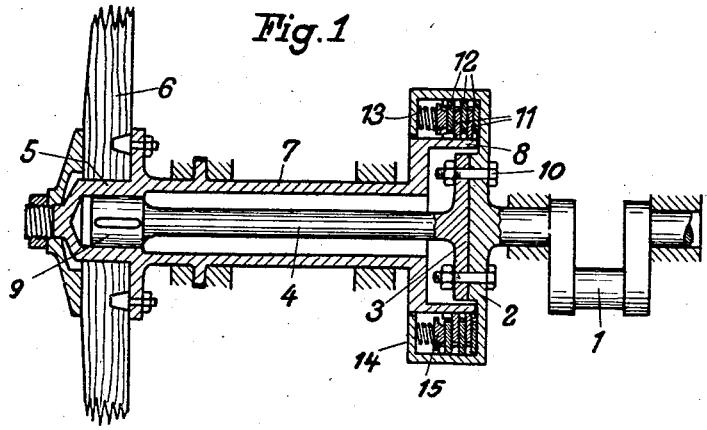

July 10, 1934.  H. JUNKERS  1,965,742

DRIVING MECHANISM FOR AIRCRAFT

Filed Jan. 14, 1932

Inventor:
Hugo Junkers

Patented July 10, 1934

1,965,742

UNITED STATES PATENT OFFICE 1,965,742

DRIVING MECHANISM FOR AIRCRAFT

Hugo Junkers, Dessau, Germany

Application January 14, 1932, Serial No. 586,591
In Germany January 21, 1931

6 Claims. (Cl. 170—177)

My invention relates to driving mechanisms for aircraft. The mechanism includes the propeller of the aircraft and is of the type in which variations in the angular velocity of the driving means, normally a reciprocating engine, are equalized by providing a resilient member, such as a resilient shaft, intermediate the driving means and the driven member, in order to eliminate as far as practicable the influence of the variations of velocity of the driving means on the driven member.

The expression "resilient shaft" is here used for a shaft which is torsionally resilient, or torsionally flexible, to such an extent that it yields to the forces exerted on it in the normal operation of the mechanism, while the expression "rigid shaft" will be used in the following specification for a shaft which does not yield to such forces at all, or not to any appreciable extent.

It has already been suggested to provide means for damping the oscillations which occur between the comparatively uniformly rotating driven member and the less uniformly rotating driving means and it has been suggested in particular to provide a separate gyratory mass, such as a flywheel, in combination with power-consuming elements intermediate the shaft to be damped and the flywheel. Such elements may be friction members, hydraulic means having narrow liquid passages or the like. The driving means whose angular velocity is subjected to considerable variations during each revolution and the more uniformly rotating flywheel alternately lag and lead with respect to each other in overcoming the resistance of the damping elements which in turn damp the oscillations. Separate gyratory masses or flywheels are comparatively large and heavy and therefore undesirable in many cases, particularly in driving mechanisms for vehicles, aircraft and the like.

It is an object of my invention to provide damping means for a mechanism of the kind described which are effective, small and light in weight and therefore particularly suitable for cases where small size and low weight are important considerations.

To this end, I provide a rotary member or driving part which is actuated by an engine developing a periodically varying torque, normally a reciprocating internal-combustion engine, and the propeller of the aircraft or engine unit, as the case may be, is the driven part. I further provide a shaft which is torsionally resilient, or torsionally flexible, as defined above, and is secured to the rotary member or driving part at one end and to the propeller or driven part at the other end, and damping means including two units or sets of damping members which may be friction members or hydraulic vanes. One of the units or sets is secured to the rotary member or driving part and the other set is secured to the propeller or driven part.

By designing the mechanism in the manner described, the propeller becomes an integral part of the damping device, since the propeller itself acts as the gyratory member or damping mass of the device, and a separate damping mass, such as a flywheel, may be dispensed with. In this manner the necessity of providing extra space for the flywheel, and the extra weight of the flywheel are eliminated, as set out above. Apart from this, the propeller is more efficient as a damping mass than a separate flywheel because such a flywheel cannot be made as large as required for efficient equalization in the restricted space available in aircraft.

It will be understood from these explanations that a driving mechanism according to my invention fulfills the requirements regarding smallness and low weight by dispensing not only with the heavy separate gyratory mass or flywheel referred to, but also with the necessity of providing flexible or resilient clutches which are usually heavy and complicated, the clutches being replaced by the simple and light resilient shaft. The only extra member is the damping means which, particularly if designed as a hydraulic damping device, is very small and in mechanisms having a reduction or other gearing, may readily be arranged in a hollow gear where it does not require any extra space.

In the drawing affixed to this specification and forming part thereof two types of driving mechanisms embodying my invention are illustrated diagrammatically by way of example.

In the drawing:—

Figure 2:
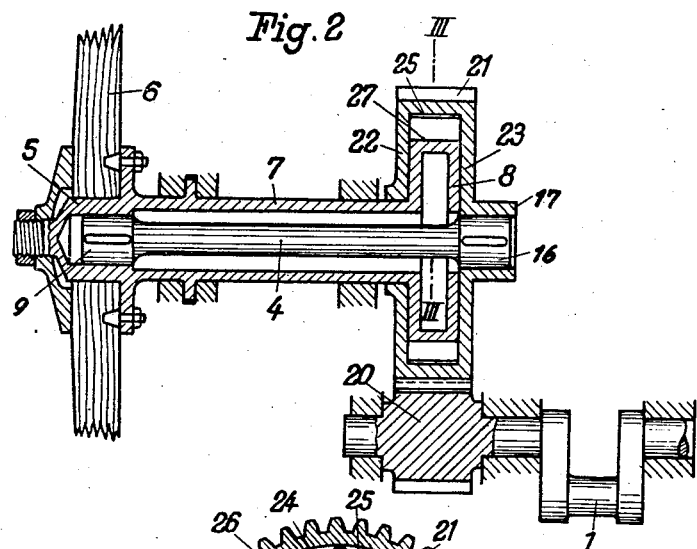
Figure 3:
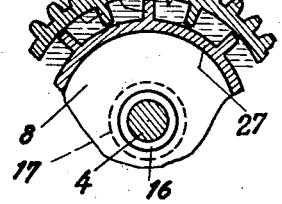

Fig. 1 is an axial section of a mechanism with frictional damping elements, in which the resilient shaft is directly connected to the crank shaft of a reciprocating engine, Fig. 2 is an axial section of a mechanism in which a reduction gearing is provided and fluid-damping elements are combined with the larger spur gear of the reduction gearing, and Fig. 3 is a section on the line III—III in Fig. 1.

Referring now to the drawing, 1 is the last throw of the crank shaft of a reciprocating engine (not shown), 4 is the resilient shaft which may be of steel or any other suitable material, 5 is the boss of the propeller 6 in which the outer end 9 of the resilient shaft is keyed, and 7 is the tubular rigid shaft which is arranged coaxially with respect to the resilient shaft. The usual bearings for the crank shaft and the tubular propeller shaft 7 are shown diagrammatically in Figs. 1 and 2, but will not be described as they form no part of the present invention.

Referring now to Fig. 1, 2 is a casing at the outer end of the crank shaft, and 3 is a flange at the inner end of the resilient shaft 4 which is connected to the bottom plate of the casing 2 by screws 10 or other suitable means. The casing 2 is a hollow cylinder with an inwardly projecting flange 14 at its outer end. 8 is a barrel at the inner end of the rigid shaft 7 which partitions an annular compartment in the casing 2 for the reception of friction elements. In the present instance, the elements are annular disks 11 which are held against rotation on the barrel 8 of the rigid shaft 7, and annular disks 12 which are held against rotation in the casing 2. 15 is an annular washer which is placed on the outermost friction element 12 of the set, and 13 are springs which are inserted between the washer 15 and the flange 14 for exerting pressure on the friction elements.

By connecting the propeller, or other gyratory mass, to the crank shaft through the resilient shaft 4 the propeller 5 is caused to rotate at a more uniform rate than the crank shaft. Consequently, during each revolution there will be certain variations in the relative angular velocity of the barrel 8 which is connected to the propeller by the rigid shaft 7, and the casing 2 which is connected to the crank shaft. The variations of velocity cause the friction elements 11 and 12 to slide and to damp out the oscillations which otherwise would be considerable.

The flywheels or the like referred to are not required and the resilient clutches also referred to are replaced by the resilient shaft 4 so that, as explained above, not only the weight of the mechanism is reduced but it is also much simplified.

Referring now to Figs. 2 and 3, the shafts 4 and 7 and the propeller 6 are arranged as described but in this instance the inner end of the resilient shaft 4 is not connected to a crank shaft but to the boss 17 of a hollow spur gear 21 with end disks 22 and 23 and vanes 26 projecting inwardly from its inner perimeter 25. The barrel 8 on the rigid shaft 7 is inserted between the end disks 22 and 23 of the spur gear 21 and equipped with vanes 24 projecting outwardly from its outer perimeter 27.

20 is a pinion on the crank shaft which meshes with the spur gear 21.

The vanes 24 and 26 are so arranged with respect to each other, as shown in Fig. 3, that there is considerable clearance between each vane 24 on the barrel 8 and the corresponding vane 26 on the spur gear 21. The vanes therefore are free to move with respect to each other for a considerable distance. The annular space between the inner perimeter 25 of the spur gear 21 and the outer perimeter 27 of the barrel 8 is filled with liquid. The liquid may be of any suitable kind, for instance, it may be lubricating oil, and its damping or power-consuming action may be adapted to given conditions by selecting more or less viscous oils. If variations of angular velocity occur between the spur gear 21 and the barrel 8 the clearances between the vanes 24 and 26 are reduced at one side, the liquid is expelled from the clearances through the narrow gaps between the ends of the vanes and the adjacent perimeter 25 or 27, and the velocity variations are damped by the resistance of the liquid.

The arrangement described with reference to Figs. 2 and 3 is particularly favorable because the damping elements are housed in the gear 21 and it is not necessary to provide an extra casing for their reception, as in the case illustrated in Fig. 1 and the weight of the mechanism is increased only to quite an insignificant extent.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A mechanism for driving aircraft from an engine developing a periodically varying torque, comprising a rotary member driven by the engine as the driving part, a propeller as the driven part, a shaft which is torsionally resilient to such an extent as to yield to the forces exerted on it in the normal operation of the mechanism, and is secured to said rotary member or driving part and to said propeller or driven part, and damping means including two units and power-consuming means interposed between the two units; one of which units is secured to said rotary member or driving part while the other is secured to said propeller or driven part, said units being adapted to move with the parts to which they are secured.

2. A mechanism for driving aircraft from an engine developing a periodically varying torque, comprising a rotary member driven by the engine as the driving part, a propeller as the driven part, a shaft which is torsionally resilient to such an extent as to yield to the forces exerted on it in the normal operation of the mechanism, and is secured to said rotary member or driving part and to said propeller or driven part, a shaft which is torsionally rigid to such an extent as not to yield to the said forces, and is arranged coaxially with said resilient shaft and secured to one of said parts at one end, and damping means including two units and power-consuming means interposed between the two units; one of which units is secured to said rigid shaft while the other unit is secured to the other one of said parts, each unit being adapted to move with the part, or shaft, to which it is secured.

3. A mechanism for driving aircraft from an engine developing a periodically varying torque, comprising a rotary member driven by the engine as the driving part, a propeller as the driven part, a shaft which is torsionally resilient to such an extent as to yield to the forces exerted on it in the normal operation of the mechanism, and is secured to said rotary member or driving part and to said propeller or driven part, a shaft which is torsionally rigid to such an extent as not to yield to the said forces, and is arranged coaxially with said resilient shaft and secured to said propeller at one end, and damping means including two units and power-consuming means interposed between the two units; one of which units is secured to said rotary member while the other is secured to the other end of said rigid shaft, each unit being adapted to move with the part or shaft to which it is secured.

4. A mechanism for driving aircraft from an engine developing a periodically varying torque, comprising a gear wheel adapted to be rotated by said engine, a rotary member having a gear meshing with said first-mentioned gear, a propeller, a shaft which is torsionally resilient to such an extent as to yield to the forces exerted on it in the normal operation of the mechanism, and is connected to said propeller and to said rotary member, and damping means including two units and power-consuming means interposed between the two units; one of which units is secured to said rotary member or driving part while the other is secured to said propeller or driven part, said units being adapted to move with the parts to which they are secured.

5. A mechanism for driving aircraft from the engine developing a periodically varying torque, comprising a gear wheel adapted to be rotated by said engine, a hollow rotary member having a gear meshing with said first-mentioned gear, said rotary member being the driving part, a propeller as the driven part, a shaft which is torsionally resilient to such an extent as to yield to the forces exerted on it in the normal operation of the mechanism, and is secured to said rotary member or driving part and to said propeller or driven part, and damping means in said hollow rotary member including two units, power-consuming means interposed between the two units; one of which units is secured to said rotary member or driving part while the other is secured to said propeller or driven part, said units being adapted to move with the parts to which they are secured.

6. A mechanism for driving aircraft from the engine developing a periodically varying torque, comprising a gear wheel adapted to be rotated by said engine, a hollow rotary member having a gear meshing with said first-mentioned gear, said rotary member being the driving part, a propeller as the driven part, a shaft which is torsionally resilient to such an extent as to yield to the forces exerted on it in the normal operation of the mechanism, and is secured to said rotary member or driving part and to said propeller or driven part, and hydraulic damping means including a set of vanes secured to said rotary member or driving part, another set of vanes secured to said propeller or driven part, and a power-consuming liquid adapted to cooperate with said vanes.

HUGO JUNKERS.